United States Patent
Nakagawa et al.

(10) Patent No.: US 6,932,693 B2
(45) Date of Patent: Aug. 23, 2005

(54) AIR-CONDITIONING APPARATUS

(75) Inventors: Nobuya Nakagawa, Aichi (JP); Tetsuo Tominaga, Takasago (JP); Hajime Izumi, Takasago (JP); Toshihisa Kondo, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 30 days.

(21) Appl. No.: 10/377,631

(22) Filed: Mar. 4, 2003

(65) Prior Publication Data

US 2004/0093883 A1 May 20, 2004

Related U.S. Application Data

(63) Continuation of application No. PCT/JP02/07450, filed on Jul. 23, 2002.

(30) Foreign Application Priority Data

Jul. 24, 2001 (JP) ........................................ 2001-222688

(51) Int. Cl.7 ................................................ B60H 1/26
(52) U.S. Cl. ...................................................... 454/137
(58) Field of Search ............................... 454/107, 108, 454/109, 137, 144, 156, 158

(56) References Cited

U.S. PATENT DOCUMENTS 4,870,895 A * 10/1989 Mayer ......................... 454/120
6,120,090 A * 9/2000 Van Ert et al. ............... 296/211
6,598,665 B2 * 7/2003 Schwarz ........................ 165/42
6,616,523 B1 * 9/2003 Tani et al. .................... 454/137

FOREIGN PATENT DOCUMENTS

| DE | 1953902 | | 1/1967 | | |
|---|---|---|---|---|---|
| DE | 2914552 C2 | | 10/1979 | | |
| DE | 8813561 | | 3/1989 | | |
| DE | 10056955 A1 | | 6/2001 | | |
| EP | 0941879 A2 | | 9/1999 | | |
| FR | 2659908 | | 9/1991 | | |
| JP | 64-70642 | | 3/1989 | | |
| JP | 7-318102 | | 12/1995 | | |
| JP | 2001039149 A | * | 2/2001 | ............ | B60H/1/00 |
| JP | 2001-150944 | | 6/2001 | | |

* cited by examiner

*Primary Examiner*—Harold Joyce
(74) *Attorney, Agent, or Firm*—Wenderoth, Lind & Ponack, L.L.P.

(57) ABSTRACT

An air-conditioning apparatus 1 for a vehicle has an air supply duct 6 for supplying air and a vent 40 communicating with the air supply duct 6 for blowing the air into a compartment of the vehicle. The direction of the air blown from the vent 40 is adjustable. The air supply duct 6 includes a branch chamber 14, 16 for reducing flow speed of the air flowing through the air supply duct 6 so that the speed-reduced air in the branch chamber 14, 16 is blown from the vent 40.

15 Claims, 4 Drawing Sheets

AIR-CONDITIONING APPARATUS

REFERENCE TO RELATED APPLICATION

This is a continuation of International Patent Application No. PCT/JP02/07450, filed Jul. 23, 2002.

BACKGROUND OF THE INVENTION

1. Field of the Invention

The present invention relates to an air-conditioning apparatus and in particular to an air-conditioning apparatus for a vehicle.

2. Description of the Related Art

The increasing popularity of sports utility vehicles (SUVs), which are substantially longer than ordinary passenger cars, has led to the installation in SUVs of air-conditioning apparatuses for supplying air, a stream of cool air for example, to the center and rear seats of the SUV, that is, to the second and third row of seats.

FIG. 4 is a perspective view showing an example of such an air-conditioning apparatus. As shown in FIG. 4, an air-conditioning apparatus 50 has a ceiling duct 52 provided on a ceiling VC of a vehicle V for supplying conditioned-air, for example, a stream of cool air, and four vent grilles 54 provided on the ceiling VC to communicate with the ceiling duct 52. The direction of the air blown from the vent grilles 54 is adjustable. The ceiling duct 52 extends along the ceiling between the center seats and the rear seats from the left to the right of the vehicle. FIG. 5 is a bottom view of the ceiling duct 52. As shown in FIG. 5, the four vent grilles 54 include two front vent grilles 56 and two rear vent grilles 58. The front vent grilles 56 and the rear vent grilles 58 include right vent grilles 56R, 58R and left vent grilles 56L, 58L. As shown in FIG. 4, the air, such as a cool air stream, conditioned by an air conditioner unit 60 provided at the rear VB of the vehicle V is led to the ceiling duct 52 along the side VS of the vehicle V and flows through the ceiling duct 52. The cool air stream flowing through the duct is blown into the compartment VR of the vehicle V through the vent grilles 56, 58. The cool air stream is blown forward from the front vent grilles 56 and the cool air stream is blown rearward from the rear vent grilles 58. Since the blowing direction of the cool air stream is adjustable by the vent grilles 56, 58, passengers sitting in the center and rear seats are able to change the direction of the cool air stream to direct it to their own faces.

The above-mentioned air-conditioning apparatus 50 has the drawback that when passengers sitting in the center and rear seats adjust the direction of the cool air stream during operation of the apparatus 50, the flow speed and volume of the cool air stream blown from the vent grilles 56, 58 may become larger or smaller. For example, when the blowing direction from the vent grilles 56, 58 is directed toward the right, the air flow speed and volume can be maintained relatively large because the cool air stream flowing from the ceiling duct 52 extending from the left to the right is blown toward the right without changing its flow direction. On the other hand, when the blowing direction from the vent grilles 56, 58 is directed toward the left, the air flow speed and volume may be relatively small because the flow direction of the cool air stream flowing through the ceiling duct 52 from the left to the right is turned around by approximately 180 degrees to allow the cool air stream to be blown toward the left. Therefore, there is a problem in that passengers sitting in the center and rear seats are not able to adjust both the direction and the flow speed and volume of the cool air stream at the same time.

Further, in the above-mentioned air-conditioning apparatus 50, the cool air streams are blown from the front vent grilles 56 toward the back of the heads of the passengers sitting in the center seats. Since it is preferable for a cool air stream to be blown onto the face, passengers sitting in the center seats of the vehicle equipped with the air-conditioning apparatus 50 are not able to get a satisfactory cool feeling.

Further, since in the above-mentioned air-conditioning apparatus 50 the ceiling duct 52 extends from the left to the right in the lateral direction of the vehicle, the flow speed and volume of the cool air stream blown from the right vent grilles 56R, 58R tends to be smaller than that blown from the left vent grilles 56L, 58L. Therefore, the amount of cool air a passenger receives is likely to differ depending on whether he or she sits on the left side or the right side of the center and rear seats.

SUMMARY OF THE INVENTION

It is therefore an object of the present invention to provide an air-conditioning apparatus that minimizes the change in the speed and volume of supplied air when the direction of air blown from a vent is changed.

To achieve the above-mentioned object, the present invention provides an air-conditioning apparatus comprising an air supply duct for supplying air and at least one vent communicating with the air supply duct for blowing the air into a compartment of the vehicle. The direction of the air blown from the vent being adjustable, and the air supply duct including at least one branch chamber for reducing flow speed of the air flowing through the air supply duct so that the speed-reduced air in the branch chamber is blown from the vent.

In this air-conditioning apparatus, air is supplied through the air supply duct. The flow speed of the air flowing through the air supply duct is reduced in the branch chamber included in the air supply duct. This eliminates the directionality of the flow of the speed-reduced air in the branch chamber. When the air deprived of directionality is blown from the vent, the air is blown at an equal blowing speed and volume irrespective of direction. Consequently, the variation of the speed and volume of the air stream or the air is small when the blowing direction thereof is changed.

The branch chamber preferably includes a front wall for guiding the air flowing in the air supply duct into the branch chamber, the front wall having a curved surface for gradually changing the airflow direction and the vent communicating with the branch chamber at a location behind a centroid of the branch chamber.

In this air-conditioning apparatus, the air flowing in the air supply duct is guided into the branch chamber by the front wall and the flow direction of the guided air is gradually changed by the curved surface of the front wall of the branch chamber to allow the flow speed thereof to be reduced. Thus, the kinetic energy of the air guided into the branch chamber is converted into pressure energy at a small loss. The inventors found that the branch chamber has a stagnating point located behind the centroid thereof where the pressure energy becomes maximum, that is, where influence of the flow speed of the air flowing from the rear to the front through the air supply duct of the vehicle V becomes minimum. Since the vent is communicated with the branch chamber at the stagnating point, the air deprived of directionality is blown from the vent so that the variation of the speed and volume of the air is small when the direction thereof is changed.

The at least one branch chamber is preferably a plurality of branch chambers each having a vent.

In this air-conditioning apparatus, a vent can be provided at each seat so that the variation of the speed and volume of the air is small when the blowing direction thereof is changed.

The air supply duct, the branch chamber and the vent are preferably provided on a ceiling of the vehicle.

This air-conditioning apparatus offers the advantage that air can be blown toward the center and rear seats of the vehicle and the limited space in the vehicle can be utilized effectively.

The air supply duct preferably extends across the ceiling from the rear to the front of the vehicle.

The air supply duct preferably includes a chamber provided on the ceiling behind a rear seat of the vehicle and an air passage through which the air flows from the chamber to the at least one vent, the chamber having a vertical thickness that is larger than that of the air passage.

In this air-conditioning apparatus, since the vertical thickness of the chamber is larger than that of the air passage through which the air flows from the chamber to the vent, the air supply duct can supply the air from the chamber to each vent at a stable pressure so that the delivery of the air to all of the vents can be made equal.

The air passage preferably includes a first portion through which the air flows from the chamber to the vent for front side seats and a second portion through which the air flows from the chamber to the vent for rear side seats.

In this air-conditioning apparatus, the first portion through which the air flows from the chamber to the vent for the front side seats and the second portion through which the air flows from the chamber to the vent for the rear side seats are independent each other.

The chamber preferably has a vertical thickness that is two or more times larger than that of the air passage.

The at least one vent is preferably a plurality of vents provided in front of and above each of the front side seats and the rear side seats.

In this air-conditioning apparatus, since all of the vents are located in front of and above the seats, cool air streams are blown onto the faces of passengers sitting in the seats, so that a suitable cool feeling can be offered to all passengers.

DETAILED DESCRIPTION OF THE PREFERRED EMBODIMENTS

An air-conditioning apparatus that is an embodiment of the present invention will now be explained with reference to the drawings. In order to simplify the explanation, only an air-conditioning apparatus from which a cool air stream is blown will be explained.

Figure 1:
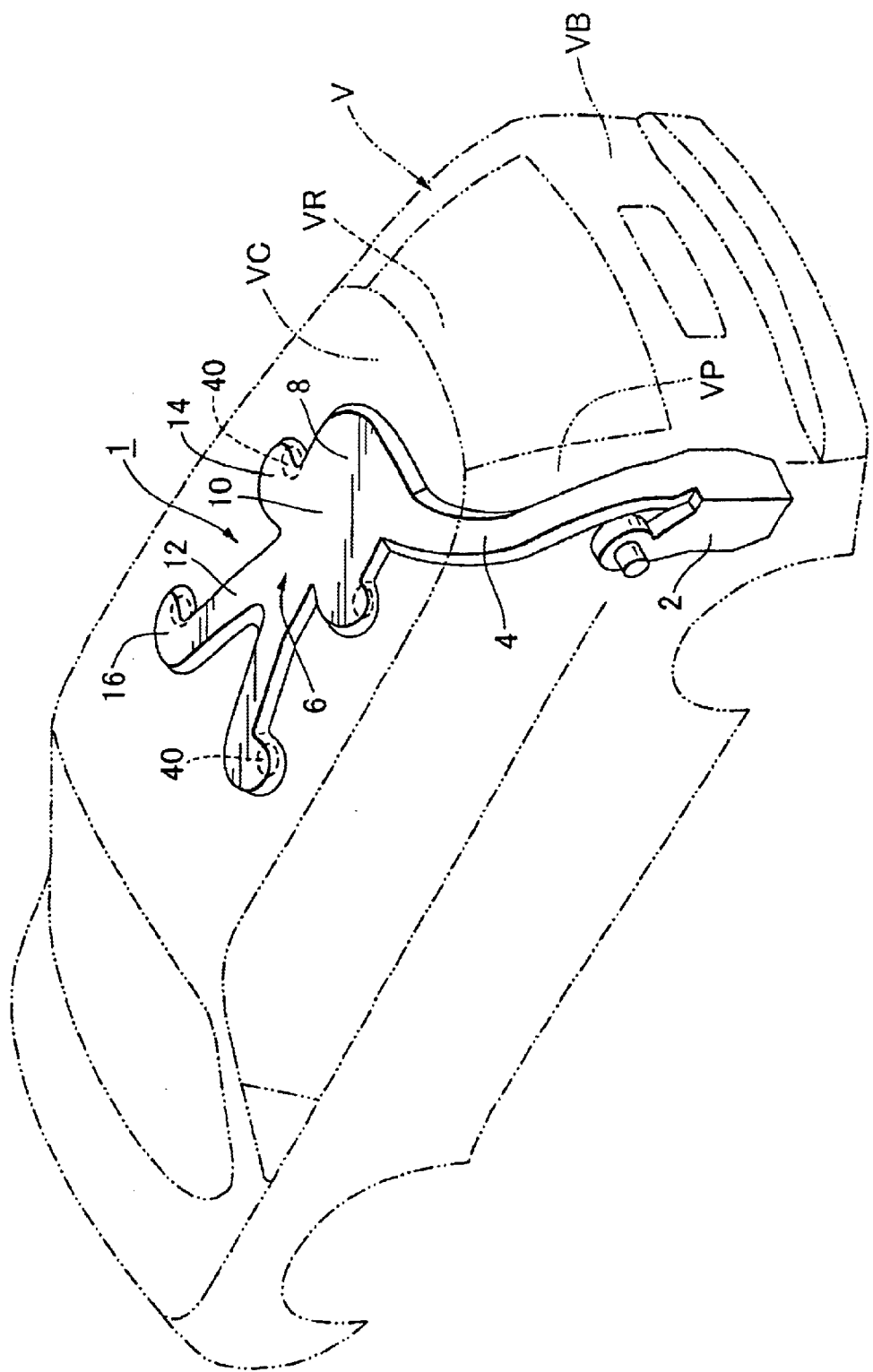
FIG. 1 is a perspective view of an air-conditioning apparatus according to the present invention.

FIG. 1 is a perspective view of an air-conditioning apparatus of an embodiment according to the present invention.

The air-conditioning apparatus 1 is provided with a cool-air stream supply device 2 disposed at the rear VB of a vehicle V, a pillar duct 4 connected to the supply device 2 and extending along a rear pillar VP to a ceiling VC of the vehicle V and a ceiling duct 6 connected to the pillar duct 4 and extending along the ceiling VC of the vehicle V.

The ceiling duct 6 includes a chamber 8 disposed in the rear VB and extending in a width direction of the vehicle, a rear main flow passage 10 extending forward with respect to the vehicle from the chamber 8, a front main flow passage 12 connected to the rear main passage 10 and further extending forward to be divided into two sections, two rear branch chambers 14 disposed adjacent to the rear main passage 10 so as to be divided therefrom and two front branch chambers 16 disposed adjacent to two terminals of the divided segments of the front main passage 12. The two rear branch chambers 14 and the two front branch chambers 16 are spaced apart in the lateral direction of the vehicle.

Figure 2:
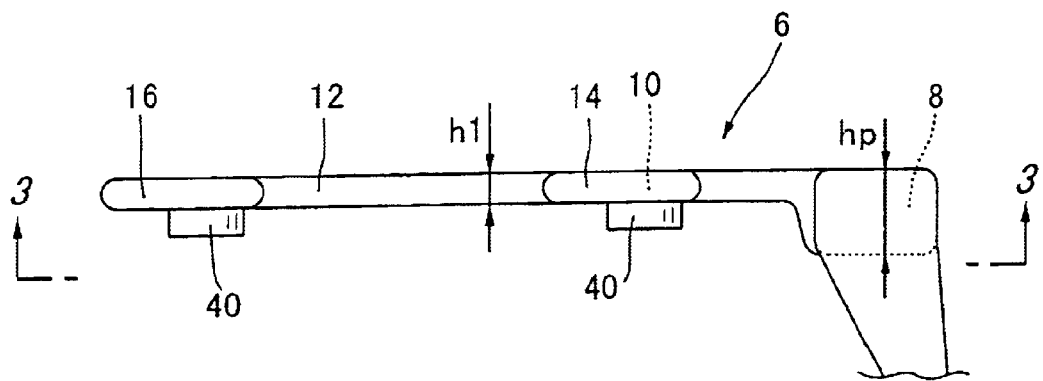
FIG. 2 is a side view of a ceiling duct of the air-conditioning apparatus according to the present invention.

FIG. 2 is a side view of the ceiling duct 6. As shown in FIG. 2, the vertical thicknesses h1 of the rear main passage 10, the front main passage 12, the rear branch chambers 14 and the front branch chambers 16 of the ceiling duct 6 are smaller than the vertical thickness hp of the chamber 8. The thickness hp of the chamber 8 is preferably two or more times larger than the thickness h1 of the ceiling duct 6.

Figure 3:
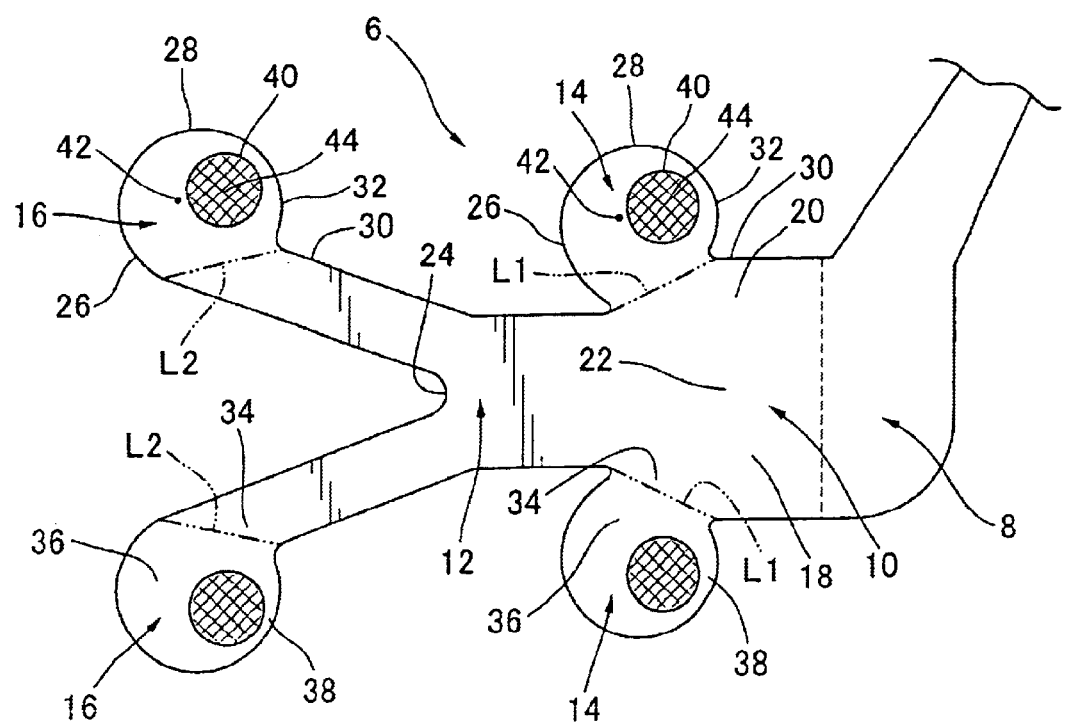
FIG. 3 is a bottom view taken along line 3—3 of FIG. 2.
Figure 4:
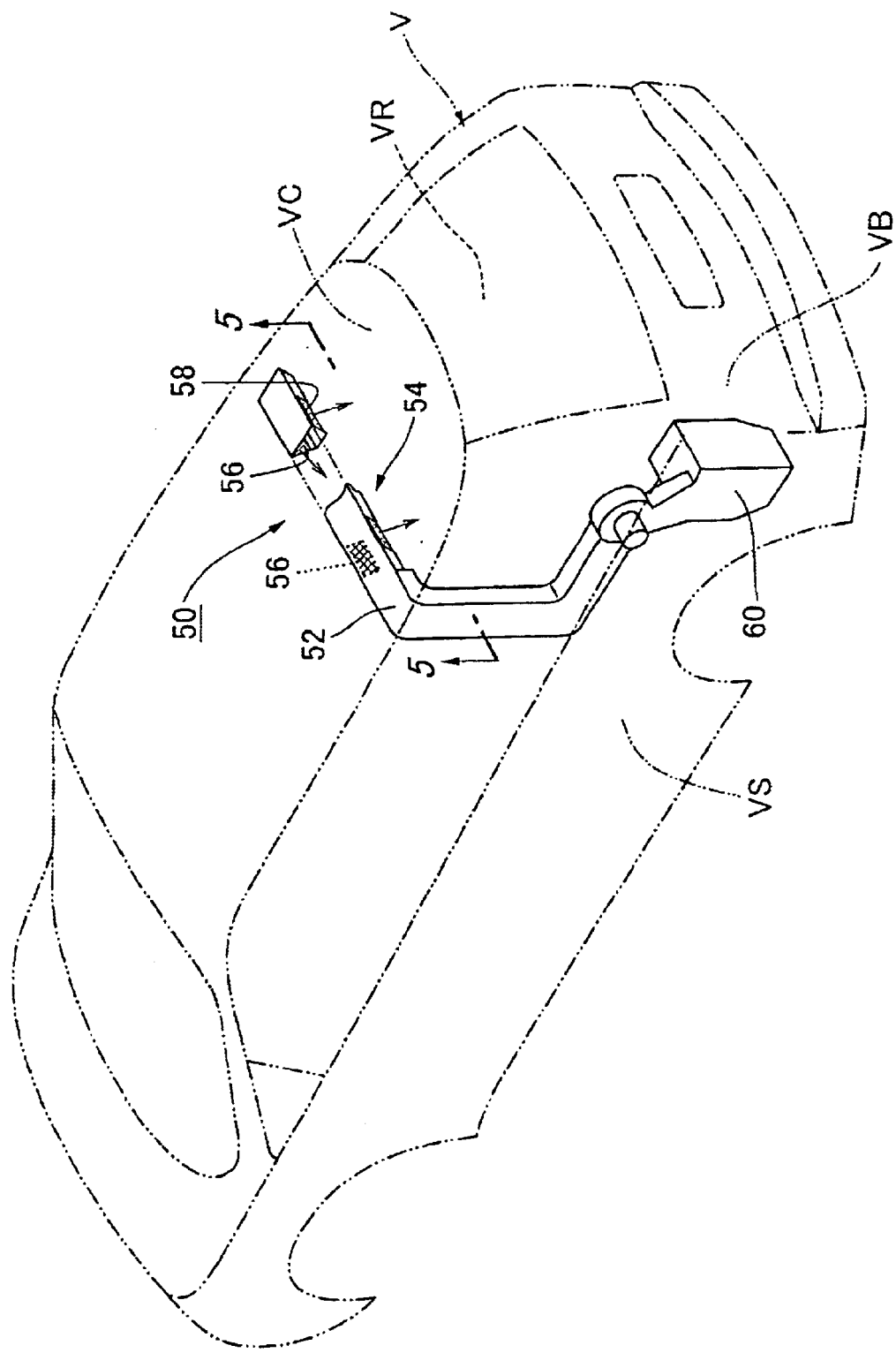
FIG. 4 is a perspective view of an air-conditioning apparatus of the prior art.
Figure 5:
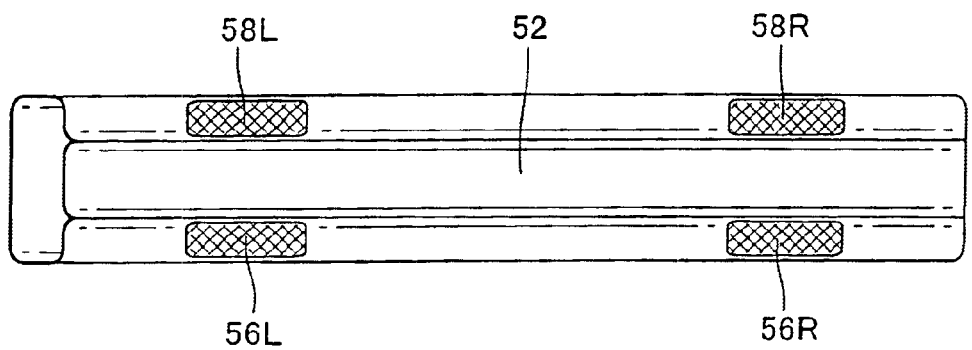
FIG. 5 is a bottom view taken along line 5—5 of FIG. 4.

FIG. 3 is a bottom view of the ceiling duct 6. The rear main passage 10 is connected with the chamber 8 so that their lengths in the lateral direction of the vehicle, that is, their widths, are the same. The rear main passage 10 includes a right portion 18 and a left portion 20 through which cool air streams flow to enter the rear branch chambers 14, and a central portion 22 through which a cool air stream flows to the front main passage 12. The width of the front main passage 12 is narrower than that of the rear main passage 10. The front main passage 12 is divided at a fork 24 into a left segment and a right segment which extend to the left side and the right side toward the front branch chambers 16. Thus, the cool air stream flowing from the chamber 8 to the front branch chamber 16 passes through the front main passage 12 and the central portion 22 of the rear main passage 10, while the cool air streams flowing from the chamber 8 to the rear branch chambers 14 pass through the right portion 18 and the left portion 20 of the rear main passage 10. These cool air streams are therefore independent of each other.

Each rear branch chamber 14 includes a front wall 26 that guides the cool air stream from the right portion 18 or the left portion 20 of the rear main passage 10 into the rear branch chamber 14, a side wall 28 smoothly connected to the front wall 26 and extending rearward, and a rear wall 32 connected to the side wall 28 and a wall 30 of the rear main passage 10. Thus, each rear branch chamber 14 includes an opening 34 through which the cool air stream flows, a front space 36 adjacent to the opening 34 and a rear space 38 disposed behind the front space 36.

The front wall 26 of each rear branch chamber 14 has a curved surface for gradually changing the flow direction of the cool air stream flowing into the rear branch chamber 14. This curved surface is, for example, an arc facing into the rear branch chamber 14 in a concave orientation The size of the opening 34 and the front space 36 as well as the position and the shape of the side wall 32 are determined so that the speed of the cool air stream whose direction is changed by the front wall 26 is gradually reduced. The size of the rear space 38 and the shape of the rear wall 32 are determined so that the speed of the speed-reduced cool air stream is further reduced. In the present embodiment, the rear wall 32 is arced.

The structure of the front branch chambers 16 is similar that of the rear branch chambers 14. However, the cool air streams enter the rear branch chambers 14 by flowing through the right portion 18 and left portion 20 of the rear main passage 10, while the cool air streams enter the front branch chambers 16 by flowing through the central passage of the rear main passage 10. Owing to this similarity, the front branch chambers 16 will not be explained in detail.

Four circular vent grilles 40 are provided on the ceiling VC of the vehicle V for blowing the cool air streams into the compartment VR of the vehicle. The four vent grilles 40 are disposed in front of and above the center seats and the rear seats, that is, the second row of seats (front side seats) and third row of seats (rear side seats) (not shown). Further, each vent grille 40 communicates with the rear branch chamber 14 or the front branch chamber 16 at a location behind the centroid 42 thereof. Each vent grill 40 includes grille fins for changing the direction of the cool air stream blown from the vent grille 40 forward, rearward, leftward and rightward over 360 degrees.

In the present embodiment, the centroid 42 of the rear branch chamber 14 or front branch chamber 16 is the center of gravity thereof. For example, each rear branch chamber 14 includes a region enclosed by the front wall 26, the side wall 28, the rear wall 32 and a line L1 connecting the starting point of the curved portion of the front wall 26 from the front main passage 12 and the starting point of the curved portion of the rear wall 32 from the rear main passage 10 so that the centroid of the rear branch chamber is given as the center of gravity of this region.

The operation of the above-mentioned air-conditioning apparatus will now be explained.

A cool air stream supplied from the cool-air stream supply device 2 enters the chamber 8 through the pillar duct 4. Then, the cool air stream in the chamber 8 enters the rear main passage 10. Since the rear main passage 10 is connected with the chamber 8 so that their widths are the same and the vertical thickness h1 of the rear main passage 10 is thinner than the vertical thickness hp of the chamber 8, the cool air stream in the chamber 8 enters the rear main passage under a constant pressure.

The cool air stream flows forward in the rear main passage 10 over the width of the rear main passage 10. The flow speed of the cool air stream is preferably low, for example, 5 m/s. Then, the cool air streams flowing through the right portion 18 and the left portion 20 of the rear main passage 10 are guided by the front walls 26 of the rear branch chambers 14 to enter the branch chambers 14. The cool air stream flowing through the central portion 22 of the rear main passage 10 flows forward further through the front main passage 12 and is then divided at the fork 24 into a left stream and a right stream. These streams are guided into the front branch chambers 16 by the front walls 26 of the front branch chambers 16. Since the air flow patterns between the cool air streams flowing into the front branch chambers 16 and the rear branch chambers 14 are similar, only the cool air streams flowing into the front branch chambers 16 will be explained.

The flow direction of the cool air stream flowing into each front branch chamber 16 from the front main passage 12 is gradually changed by the curved surface of the front wall 26 of the front branch chamber 16 and finally is turned substantially by 180 degrees. Since the flow direction of the cool air steam is changed gradually, the air flow pattern of the cool air stream flowing into the front branch chamber 16 is not disturbed. Further, the flow speed of the direction-changed cool air stream is gradually reduced in the front branch chamber 16. Thus, kinetic energy of the cool air stream is converted into pressure energy at a small loss. Then, when the speed-reduced cool air stream moves to the rear space 38 of the front branch chamber 16, the flow speed thereof is further reduced. A stagnating point of the front branch chamber 16 is present at a location behind the centroid 42. At the stagnating point, the pressure energy of the cool-air stream portion becomes maximum because of the reduction of its flow speed and, therefore, the influence of the flow speed of the cool air stream flowing forward from the rear of the vehicle V through the front main passage 12 is minimum at this point. At the stagnating point, the cool air stream loses flow directionality.

Since the vent grille 40 is located behind the centroid 42 of the front branch chamber 16, that is, at the stagnating point where the cool air stream has lost its directionality, differential pressure between the rear space 38 and the compartment VR causes the cool air in the rear space 38 to be blown from the vent grille 40 into the compartment VR. When the cool air stream is blown in a direction determined by the orientation of the grille fins 44 of the vent grille 40, the flow speed and volume of the cool air stream does not change depending on the direction in which the cool air stream is blown because the cool air in the rear space 38 has no specific flow direction. Further, when the cool air stream is blown from the vent grille 40, the pressure energy of the cool air can be efficiently converted into kinetic energy. The flow speed thereof therefore offers the vehicle passengers a suitable cool sensation because the kinetic energy thereof has been converted into the pressure energy at a small loss. The flow speed of the cool air stream is, for example, 8 m/s. The cool air stream is blown from the vent grille 40 at the same speed in any direction, for example forward, backward, leftward and rightward.

The flow pattern of the cool air stream in the rear branch chambers 14 is similar to what was explained above regarding the front branch chambers 16. Further, all of the flow patterns of the cool air streams blown from the vent grilles 40 are similar.

In the above-mentioned embodiment, the flow speed of the cool air stream flowing from the rear to the front through the rear main passage 10 or the front main passage 12 is reduced in the branch chambers 14, 16 and the cool air streams are blown from the vent grilles 40 after the cool air streams have assumed a static pressure state. This allows the flow speed and volume of the cool air streams blown from the vent grilles 40 to be substantially the same even when the direction of the cool air stream blown from the vent grille 40 is changed between forward, rearward, leftward and rightward over 360 degrees and enables the variation of the flow speed and volume of the cool air stream to be minimized when the blowing direction thereof is changed. Further, since the front walls 26 of the branch chambers 14, 16 have the curved surfaces for gradually changing the flow direction of the cool air streams guided into the branch chambers 14, 16, the kinetic energy of the cool air streams can be converted into the pressure energy at a small loss. Thus, when the cool air stream is blown from the vent grilles 40, the pressure energy thereof can be reconverted into the kinetic energy so that the magnitude of the reconverted kinetic energy is substantially the same as that of the original kinetic energy. This efficiently ensures sufficient flow speed and volume of the cool air streams blown from the vent grilles. For example, when the vent grilles 40 are oriented toward the faces of passengers sitting in the center and rear seats and the cool air streams are then blown, the amount of the cool air streams blown onto their faces is adequate to offer the passengers a suitable cool feeling. Since the flow speed and volume of the cool air stream is not changed when the blowing direction is changed about the center of the passenger's face, the direction can be changed as desired.

In the above-mentioned embodiment, since a plurality of branch chambers 14, 16 are provided and each of the branch chambers 14, 16 has a vent grille 40, the cool air stream blown from any of the vent grille 40 experiences no change in air flow speed and volume with change of the blowing direction. Since the vent grilles 40 are provided in front of and above the second and third rows of seats (front side seats and rear side seats), passengers sitting in any of these seats are able to freely change the flow direction about their own faces.

Further, since the cool air stream from the chamber 8 to the front branch chambers 16 passes through the front main passage 12 and the central portion 22 of the rear main passage 10, while the cool-air streams from the chamber 8 to the rear branch chambers 14 pass through the right portion 18 and the left portion 20 of the rear main passage 10, these cool air streams are independent of each other. The vertical thicknesses h1 of the front main passage 12 and the rear main passage 10 are smaller than that the thickness hp of the chamber 8. This allows the ceiling duct 6 to supply air from the chamber 8 to each vent grille 40 at stable pressure so that the delivery of the cool air streams to all vent grilles 40 can be made equal.

One embodiment of the air-conditioning apparatus according to the present invention has been explained above. The invention is not limited to this embodiment, however, and various modifications can be made, such as the following.

Although the foregoing explanation was limited to the case of delivering a cool air stream, conditioned air or ventilating air may be supplied instead.

Although the foregoing embodiment employs circular vent grilles, the vent grilles may have any of various shapes, for example, rectangular. In such a case, a portion corresponding to the rear wall of the branch chamber of the above-mentioned embodiment may have a flat surface.

Although the foregoing embodiment is provided with the four vent grilles, the number of vent grilles can be greater or smaller than four.

Although the cool air stream is supplied from the rear toward the front to each branch chambers in the foregoing embodiment, it can instead be supplied in the lateral direction of the vehicle.

What is claimed is:

1. An air-conditioning apparatus for a vehicle, comprising:
   an air supply duct for supplying air, said air supply duct including a flow passage that extends in an extending direction;
   at least one vent communicating with said air supply duct for blowing the air into a compartment of the vehicle, said at least one vent enabling the direction of the air blown into the vehicle to be adjustable; and
   at least one branch chamber disposed laterally with respect to said extending direction of said flow passage and adjacent to said flow passage;
   wherein said at least one said branch chamber includes a front wall for guiding air flowing in said flow passage into said branch chamber, said front wall having a curved surface such that an air flow direction of the air flowing into said branch chamber from said flow passage is gradually changed so that a flow speed of the air is reduced; and
   wherein said at least one vent communicates with said air supply duct by communicating with a respective said at least one branch chamber at an air stagnating point in said at least one branch chamber that is located behind a centroid of said at least one branch chamber.

2. The air-conditioning apparatus of claim 1, wherein said at least one branch chamber is a plurality of branch chambers and said at least one vent is a plurality of respective vents.

3. The air-conditioning apparatus of claim 1, wherein said air supply duct, said at least one branch chamber and said at least one vent are provided on a ceiling of the vehicle.

4. The air-conditioning apparatus of claim 3, wherein said air supply duct extends across the ceiling of the vehicle from the rear of the vehicle toward the front of the vehicle.

5. The air-conditioning apparatus of claim 4, wherein said air supply duct includes a chamber provided on the ceiling rearward of a rear seat of the vehicle, said chamber having a vertical thickness that is larger than that of said flow passage.

6. The air-conditioning apparatus of claim 5, wherein said at least one branch chamber is a plurality of branch chambers and said at least one vent is a plurality of respective vents, and said air supply duct comprises a first portion through which the air flows from said chamber to at least one of said vents for front side seats of the vehicle and a second portion through which the air flows from said chamber to at least one of said vents for rear side seats of the vehicle.

7. The air-conditioning apparatus of claim 5, wherein said chamber has a vertical thickness that is two or more times larger than that of said air passage.

8. The air-conditioning apparatus of claim 3, wherein said at least one vent is a plurality of vents provided in front of and above each of front side seats and rear side seats of the vehicle.

9. An air-conditioning apparatus for a vehicle, comprising:
   an air supply duct for supplying air, said air supply duct including a flow passage that extends in an extending direction;
   a plurality of vents communicating with said air supply duct for blowing the air into a compartment of the vehicle; and
   a plurality of branch chambers disposed laterally with respect to said extending direction of said flow passage, adjacent to said flow passage and in communication with said flow passage;
   wherein said branch chambers each includes a front wall provided at a forward part thereof with respect to a direction of air flow in said flow passage so that air flowing in said flow passage is guided into said branch chambers, said front wall having a curved surface such that the air flow direction of the air flowing into said branch chamber from said flow passage is gradually changed and so that a flow speed of the air is reduced, a centroid and an air stagnating point rearward of said centroid with respect to the direction of air flow in said flow passage; and
   wherein said vents communicate with said air supply duct by communicating with respective said branch chambers at said air stagnating point therof.

10. The air-conditioning apparatus of claim 9, wherein said air supply duct, said branch chambers and said vents are provided on a ceiling of the vehicle.

11. The air-conditioning apparatus of claim 10, wherein said air supply duct extends across the ceiling of the vehicle from the rear of the vehicle toward the front of the vehicle.

12. The air-conditioning apparatus of claim 11, wherein said air supply duct includes a chamber provided on the ceiling rearward of a rear seat of the vehicle, said chamber having a vertical thickness that is larger than that of said flow passage.

13. The air-conditioning apparatus of claim 12, wherein said air supply duct comprises a first portion through which the air flows from said chamber to at least one of said vents for front side seats of the vehicle and a second portion through which the air flows from said chamber to at least one of said vents for rear side seats of the vehicle.

14. The air-conditioning apparatus of claim 12, wherein said chamber has a vertical thickness that is two or more times larger than that of said air passage.

15. The air-conditioning apparatus of claim 10, wherein said vents are provided in front of and above each of front side seats and rear side seats of the vehicle.

* * * * *